United States Patent
Marisetty et al.

(10) Patent No.: US 6,754,828 B1
(45) Date of Patent: Jun. 22, 2004

(54) ALGORITHM FOR NON-VOLATILE MEMORY UPDATES

(75) Inventors: Suresh Marisetty, San Jose, CA (US); Andrew J. Fish, Olympia, WA (US); Yan Li, Olympia, WA (US); Mani Ayyar, Cupertino, CA (US); Amy O'Donnell, Chandler, AZ (US); George Thangadurai, Santa Clara, CA (US); Sham M. Datta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/352,715

(22) Filed: Jul. 13, 1999

(51) Int. Cl.[7] .................................................. G06F 9/42
(52) U.S. Cl. .............................. 713/200; 713/1; 713/2; 713/187; 713/201; 710/22; 709/310
(58) Field of Search ................................ 713/200, 187, 713/1, 2, 101; 717/168; 709/310; 710/22

(56) References Cited

U.S. PATENT DOCUMENTS

| | | | | |
|---|---|---|---|---|
| 5,408,661 A | * | 4/1995 | Kuranaga ........................ | 710/1 |
| 5,579,300 A | * | 11/1996 | Lee et al. ..................... | 370/358 |
| 5,687,947 A | * | 11/1997 | Iwamoto et al. ............ | 248/612 |
| 6,081,890 A | * | 6/2000 | Datta ............................. | 713/1 |
| 6,366,654 B1 | * | 4/2002 | Cramer et al. ............ | 379/93.09 |
| 6,400,471 B1 | * | 6/2002 | Kuo et al. ................... | 358/468 |
| 6,553,426 B2 | * | 4/2003 | Holzle et al. ................ | 709/310 |
| 6,584,573 B1 | * | 6/2003 | Wunderlich et al. ........ | 713/322 |
| 6,594,756 B1 | * | 7/2003 | Datta et al. ..................... | 713/2 |

* cited by examiner

*Primary Examiner*—Ly V. Hua
(74) *Attorney, Agent, or Firm*—Schwegman, Lundberg, Woessner & Kluth, P.A.

(57) ABSTRACT

A novel processor architecture and algorithms are provided which improve non-volatile memory updates and increases processor performance in successive generations of processors. A new processor architecture is supported by a software model consisting of two new firmware layers and the legacy 32 bit basic input output system (BIOS) firmware. The new firmware layers consist of a Processor Abstraction Layer (PAL) and a System Abstraction Layer (SAL). The PAL and SAL have procedure calls which allow updates of the firmware components in the non-volatile memory of a system, e.g. non-volatile ROM.

The present invention includes invoking a system abstraction layer update procedure to implement a new input binary into the non-volatile memory. An algorithm for the non-volatile memory includes selecting a lead processor to perform an update and using the system abstraction layer update procedure. The system abstraction layer update procedure is used to call an appropriate authentication routine. The system abstraction layer update procedure is used to call a specific non-volatile memory implementation routine.

43 Claims, 4 Drawing Sheets

ALGORITHM FOR NON-VOLATILE MEMORY UPDATES

FIELD OF THE INVENTION

The present invention relates generally to the field of electronic data processing devices. More particularly, the present invention relates to new processor architecture and algorithms for non-volatile memory updates.

BACKGROUND OF THE INVENTION

In any computer system it is extremely important to protect the boot code that is contained in the non-volatile read only memory (ROM) from being accidentally erased. If ROM boot code is destroyed, the machine will not even boot to an operating system making recovery almost impossible. Since today's machines use small flash ROM packages the end user can not recover a system that has lost its ROM data because the ROM component can not be replaced by the end user. All this means is that a software virus attack that destroys boot ROM code is entirely unacceptable. Hence it is necessary to have a full guarantee that boot ROM code is protected by the virtue of design and yet is updatable to a newer valid firmware. It is also necessary in a multiprocessor system that one processor execute the flash ROM update and other processors are in rendezvous state while a valid update is being processed.

In the prior art of 32 bit processors, on chip micro-code is generally provided with a patching facility. Unfortunately, this prior art method is unsuitable in the case of successive generation 64 bit processors which no longer possess the prior art micro-code patching facility. Also, the prior art micro-code patching facility is useful only to embed a 2 kilo-byte (KB) patch into ROM and is unable to perform an update of 1 mega-byte (MB) or greater.

For the reasons stated above, and for other reasons stated below which will become apparent to those skilled in the art upon reading and understanding the present specification, it is desirable to develop improved methods for updating non-volatile memory in successive processor generations.

SUMMARY OF THE INVENTION

A novel processor architecture and algorithms are provided which improve non-volatile memory binary code updates and increase processor performance in successive generations of processors. A new processor architecture is supported by a software model consisting of two new firmware layers and the legacy 32 bit basic input output system (BIOS) firmware. The new firmware layers consist of a Processor Abstraction Layer (PAL) and a System Abstraction Layer (SAL). The PAL and SAL have procedure calls which allow updates of the firmware components in the non-volatile memory of a system, e.g. non-volatile ROM.

The present invention includes invoking a system abstraction layer update procedure to implement a new input binary into the non-volatile memory. An algorithm for the non-volatile memory update includes selecting a lead processor to perform an update and using the system abstraction layer update procedure. The system abstraction layer update procedure is used to call an appropriate authentication routine. The system abstraction layer update procedure is then used to call a specific non-volatile memory implementation routine.

DETAILED DESCRIPTION

In the following detailed description numerous specific details are set forth in order to provide a thorough understanding of the invention. However, it will be understood by those skilled in the art that the present invention may be practiced without these specific details. In other instances well known methods, procedures, components, and circuits have not been described in detail so as not to obscure the present invention.

Figure 1:
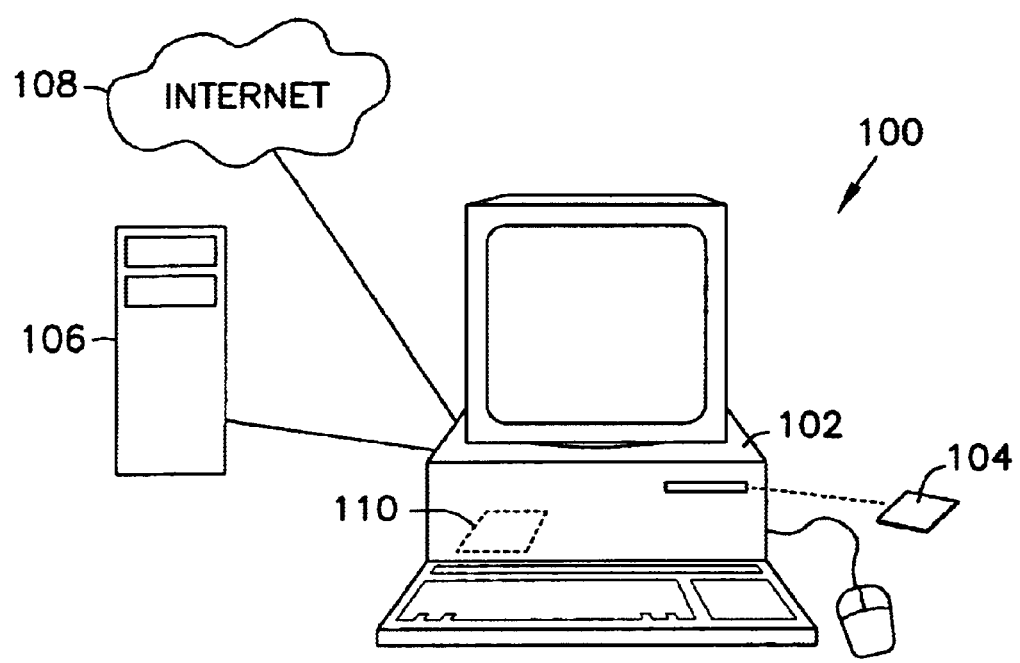
FIG. 1 illustrates a network according to the teachings of the present invention

FIG. 1 is an illustration of a system configuration 100 according to the teachings of the present invention. The system configuration 100 includes an electronic system 102. In one embodiment, the electronic system 102 includes a personal computer 102. In an alternative embodiment, the electronic system 102 includes a system server 102 or a microcontroller 102. As shown in the embodiment of FIG. 1, the electronic system 102 is linked to the Internet 108 and to another server 106 as part of the system configuration 100. In one embodiment, the electronic system 102 is a reliable, available and serviceable (RAS) electronic system 102. The electronic system 102 can be linked to the Internet 108 and server 106 either in a direct hardwired fashion or indirectly in a wireless fashion using remote electromagnetic signal transmission in the radio or microwave frequencies. In FIG. 1, the electronic system 102 includes computer readable medium such as a disk drive for reading data storage media, e.g. a compact disc 104. The electronic system 102 also includes computer readable medium such as random access memory (RAM) and read only memory (ROM). The electronic system further includes a control system 110.

Figure 2:
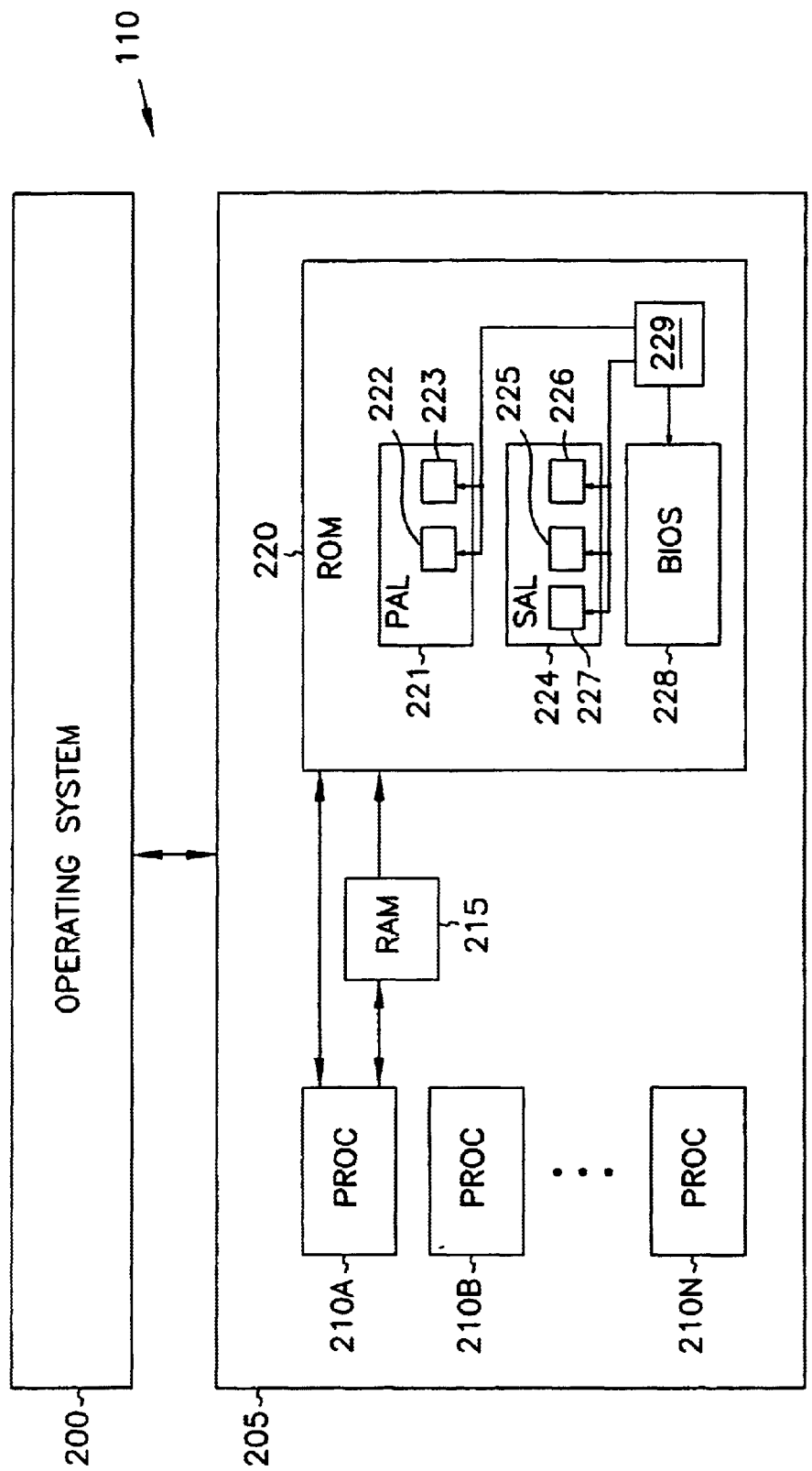
FIG. 2 illustrates, in block diagram form, a successive generation processor architecture according to the teaching of the present invention.

FIG. 2 illustrates is a block diagram illustrating the control system 110 according to the teachings of the present invention. The control system 110 includes an operating system 200 which is communicatively coupled to a processor architecture 205. In one embodiment, the processor architecture 205 includes a number of processors, 210A, 210B, . . . , 210N, which couple to non-volatile memory 220. In one embodiment, the number of processors, 210A, 210B, . . . , 210N, and the non-volatile memory 220 are on separate chips. In an alternative embodiment, the number of processors, 210A, 210B, . . . , 210N, and the non-volatile memory 220 are located on the same chip. The non-volatile memory 220 includes a FLASH memory, an electrically erasable and programmable read only memory (EEPROM), or any other suitable non-volatile memory 220. The non-volatile memory 220 includes a binary code module called a processor abstraction layer 221 (PAL) and a binary code module called a system abstraction layer 224 (SAL). The non-volatile memory 220 includes a data structure or directory structure 229 with pointers to different components of the firmware, each of which can come from different sources or owners to be finally merged together as a firmware (FW) entity. In one embodiment, and as referred to in this application, the directory structure 229 is called the Firmware Interface Table 229 (FIT). The non-volatile memory 220 can further include the legacy 32 bit basic input output system 228 (BIOS).

The FIT 229 provides information about each firmware component in the non-volatile memory 220, such as location of the component within the non-volatile memory 220, length of the component, checksum, version number, etc. Firmware components may be developed by different organizations at different times. These components will be built separately but will need to interact with each other. The FIT 229, acting as the repository of the locations of various firmware components facilitates this interaction. Further, the FIT 229 permits the replacement/addition of an individual firmware component within the non-volatile memory 220. Also, the FIT 229 allows the flexibility of positioning a firmware component at any convenient place in the non-volatile memory 220, thus allowing for better management of non-volatile memory 220 space. The FIT data structure contains the checksum of a firmware component that may be verified prior to its execution and this facilitates reliable booting.

The PAL 221 includes multiple binary code blocks 222 which are provided by the processor vendor, and which provides a standard firmware interface to abstract processor implementation specific features of the processor architecture 205. The PAL 221 is integrated with other code layers such as the SAL 224 which similarly includes binary code blocks 225. This poses unique issues to original equipment manufacturers (OEMs), since the PAL 221 binary code 222 is not an independent block living in a separate ROM device but an integrated component with other OEM controlled software layers. It also opens up a huge potential for a probable software virus attack from a malignant binary code block that looks like a valid PAL 221 binary code block 222 for a non-volatile ROM update utility. The virus issue is so potent that OEMs usually do not allow any binary blocks to be integrated into their system ROM today.

In one embodiment, the PAL 221 includes protected binary code blocks 222 comprising enhancements and bug fixes that are made to the processor architecture 205 over time. It is important for the processor vendor to be able to control the update of the PAL 221 by the end user in order to make sure that all enhancements and bug fixes made to the processor architecture 205 are made correctly. It is similarly important for original equipment manufacturers (OEMs) to be able to control updates to OEM provided components which are integrated into the non-volatile memory 220.

The present invention facilitates this need by defining a unique SAL procedure interface block 227 within the SAL 224. The unique SAL procedure interface block 227 is copied into random access memory (RAM) 215 where is exposed to a caller program of an update utility, also present in RAM 215, when an update is to be performed. The SAL procedure interface block 227 imposes a unique header onto the multiple binary code blocks 222 in the PAL 221 and onto multiple binary code blocks 225 in the SAL 224. This unique header will contain a version number that will follow an ascending order and a date stamp that can be checked against the corresponding fields in the FIT structure 229 associated with the code blocks, 222 and/or 225, contained in the non-volatile memory 220. The present invention also solves the issue of virus attack threat by making it mandatory for the SAL procedure interface to call an authentication routine before allowing access to the already programmed binary blocks, 222 and/or 225, in the PAL 221 and SAL 224 of the non-volatile memory 220. Both the PAL 221 and SAL 224 include an authentication routine, 223 and 226 respectively, for the protected binary code, 222 and 225 respectively. This authentication routine will authenticate the newer binary blocks that are submitted to PAL 221 and SAL 224 in the non-volatile memory 220.

The SAL procedure interface block 227 design makes certain that only authenticated binary blocks of an appropriate version and date as compared to the binary blocks, 222 and/or 225, contained in the non-volatile memory 220, are allowed to replace the non-volatile memory 220 copies of the binary blocks, 222 and/or 225, as well as update the FIT data structures in interface block 229 that are associated with or point to the protected binary blocks, 222 and/or 225. The SAL procedure interface makes sure that new input binaries, which fail authentication, do not update the non-volatile memory, and hence protects the non-volatile memory from virus attacks. In this manner, it is not possible for random access memory (RAM) based code (e.g. a malignant virus), to initiate a non volatile memory update and destroy the boot code. Additionally, the SAL procedure interface block 227 design ensures that the new versions of PAL 221 binary blocks 222 are compatible with all the processors within the system configuration 100 to ensure successful boots subsequently.

Included within the scope of the present invention are at least two scenarios in which an update to the non-volatile memory of a system may occur. A first scenario includes performing an update to non-volatile memory during boot time in firmware. A second scenario includes performing an update to non-volatile memory while the operating system is up and running.

Figure 3:
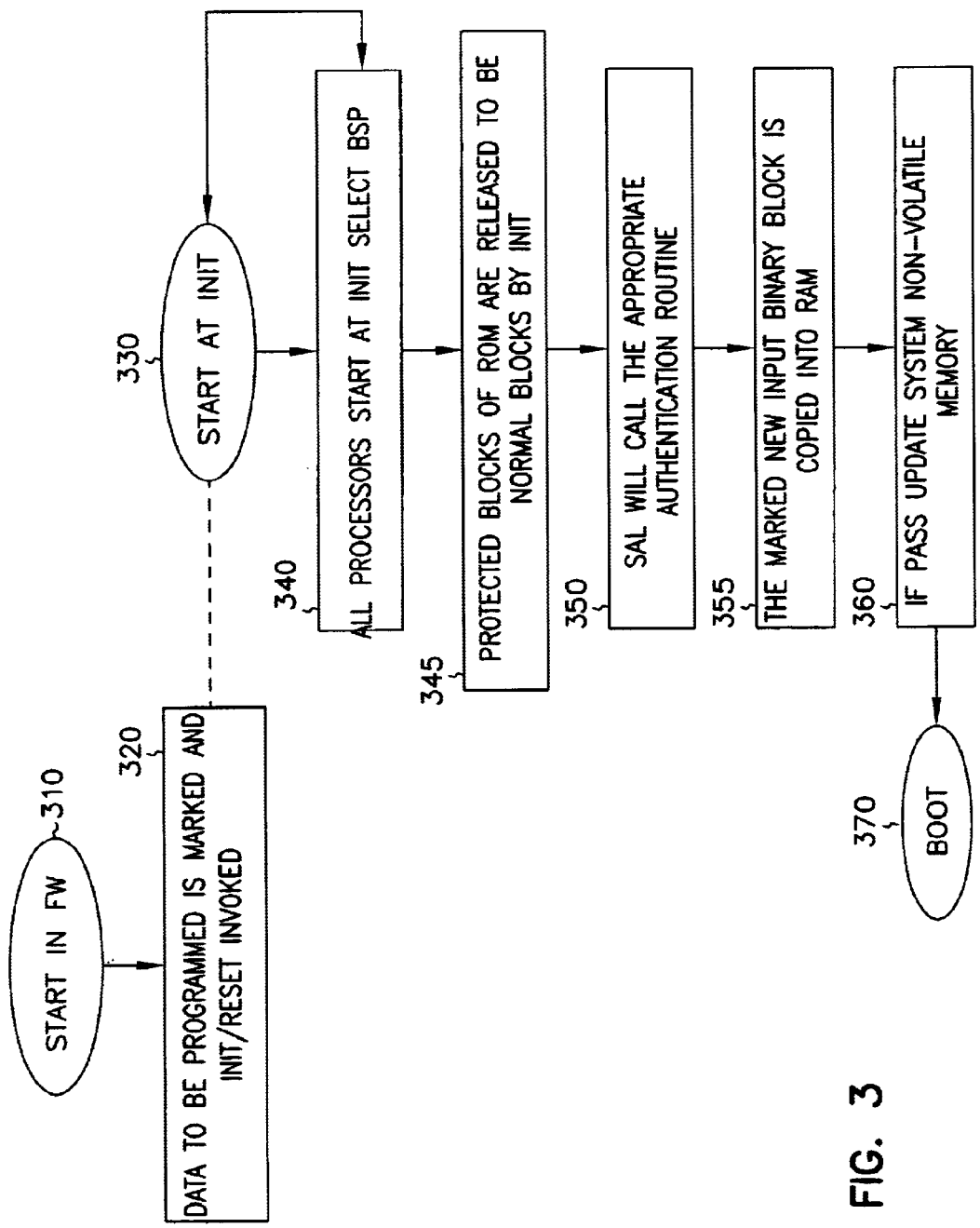
FIG. 3 illustrates, in flow diagram form, a method for authenticating and updating non-volatile memory at designated hardware events in successive processor generations according to the teachings of the present invention.

FIG. 3 illustrates, in flow diagram form, a method for updating non-volatile memory during boot time in firmware. Here, the update will be performed at a designated hardware event, e.g. initialize mode (INIT) in successive processor generations according to the teachings of the present invention. As shown in FIG. 3, the update procedure starts in the firmware (FW) 310. Data or a new input binary to be programmed is marked and a hardware event, e.g. an initialize/reset (INIT/RESET) mode is invoked 320. Control is here transferred over to the INIT mode. Next the INIT mode will serve as a starting point for the update sequence 330. The INIT and/or RESET is invoked using chip set registers after the new input binary that needs to be programmed in the non-volatile memory has been brought into memory, e.g. RAM. In a successive generation processor based system according to the teachings of the present invention, the invocation of hardware events like INIT/RESET brings the machine to native mode and forces execution from ROM resident code in the non-volatile memory. Additionally, the INIT/RESET signal releases write protected blocks of non-volatile memory for normal programming 345 in certain embodiments of non-volatile memory such as flash memory. The transition to native mode permits a single code block to update the firmware components regardless of the current Instruction Set Architecture (ISA) of the processor. This ROM resident code includes a SAL procedure interface contained in the SAL as described and explained in detail with connection to FIG. 2.

By arranging this ROM resident code to be in hardware protected regions of the non-volatile memory, it is ensured that the code will be present and secure. According to the teachings of the present invention, the INIT/RESET code in the successive generation processor based system runs in the highest privilege level and in physical mode making it possible to do raw accesses to the non-volatile memory. Also, since the INIT mode is of the highest priority it will bring all of the processors, in a multi-processor system, into the INIT/RESET code block and the code can then select one processor, e.g. a boot strap processor (BSP), to serve as a lead processor and process the non-volatile memory update 340. The INIT signal releases protected binary blocks of ROM to be normal blocks for normal programming 345. Meanwhile, the lead processor will then communicate with the SAL procedure interface that has been copied from the SAL of the non-volatile memory into RAM. The SAL procedure interface will call an appropriate authentication routine to validate the new input binary. In the case of a PAL update, the SAL procedure calls the PAL authentication routine within the PAL in the non-volatile memory. In the case of a SAL update, the SAL procedure will call the vendor specific SAL authentication routine within the SAL in non-volatile memory. At this point the marked new input binary is also copied to an available block of RAM 355.

Only a new input binary block which passes the authentication routine of the trusted code and is executing in INIT mode will be allowed access to the non-volatile memory 360. In this case, the new input binary which has passed the authentication routine will be copied into the non-volatile memory 360, and the directory table entries within the FIT 229 will be adjusted to point to this new binary block. In certain embodiments of non-volatile memory such as FLASH memory, further writes to the non-volatile memory blocks containing code will be prevented by setting certain lock bits associated with the non-volatile memory. Next the system will perform a boot 370.

If the authentication fails, the new input binary will not be allowed to access the non-volatile memory 360. Here, the INIT code in the firmware can get back to the operating system by returning through the operating system registered INIT handler.

Figure 4:
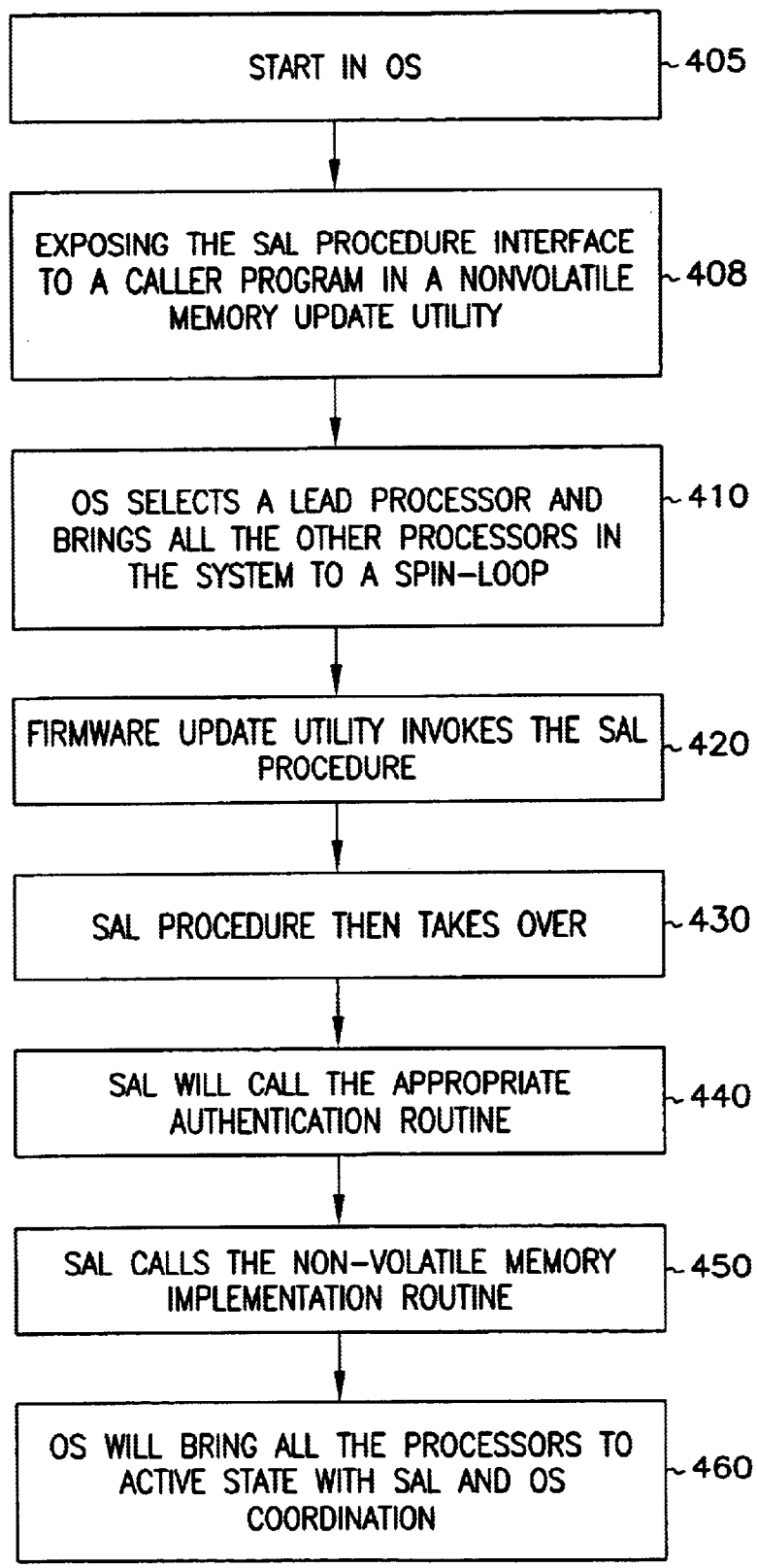
FIG. 4 illustrates, in flow diagram form, a method for run-time authentication and update of non-volatile memory in successive processor generations according to the teachings of the present invention.

FIG. 4 illustrates, in flow diagram form, a second scenario for performing updates to non-volatile memory when the operating system is up and running. In other words, FIG. 4 illustrates a method for run-time updates which starts through the operating system (OS) using an update utility 405. The SAL procedure interface from the non volatile memory is copied into RAM where it is exposed, or operatively coupled, to a caller program of an update utility 408 for updating the non volatile memory with a new input binary. The OS selects a lead processor and brings all the other processors in the system to a spin-loop 410. As shown in FIG. 4, a firmware update utility invokes a system abstraction layer (SAL) update procedure call 420, or SAL procedure interface. Here the SAL update procedure is directed to the new firmware component, e.g. a new input binary, to be added to the non-volatile memory. The new firmware component, or new input binary, is provided by a data storage disk, over the Internet, or through a server network as described in connection with FIG. 1. The SAL procedure then takes over 430 to lead the update procedure and can at this stage perform preliminary security checks and authentication of the new input binary. Additionally, the SAL procedure ensures that the new versions of PAL binary blocks 221 are compatible with all the processors within the system configuration 100 to ensure successful boots subsequently.

In an alternative embodiment for a run-time update, the SAL procedure interface selects the lead processor in coordination with an operating system for the electronic system of FIG. 1. In both embodiments, the other processors are kept in an idle loop and will not contend or conflict with the resources that the SAL procedure interface requires to perform the update of the non-volatile memory. The SAL procedure interface will call an appropriate authentication routine 440 to be certain that the new input binary accords with trusted code from the vendor. In the case of a PAL update, the SAL procedure interface calls the PAL authentication routine from the PAL in the non-volatile memory. In the case of a SAL update, the SAL procedure will call the vendor specific SAL authentication routine. Once the authentication process is complete, the SAL procedure will call the specific non-volatile memory implementation routine needed 450. For example, the SAL procedure will call the appropriate platform implementation specific non-volatile memory erase and write functional modules for a successful completion of the firmware update. Again, this is done with the SAL procedure working in coordination with the operating system (OS) of the electronic system.

In certain embodiments of non-volatile memory such as FLASH memory, further writes to the non-volatile memory blocks containing code will be prevented by setting certain lock bits associated with the non-volatile memory. After successfully completing the update of the relevant code blocks in the non-volatile memory, in one embodiment, the SAL procedure can reset the electronic system, so that all the processors will load and execute the new input binary, or updated firmware. In an alternative embodiment, the OS will copy the new input binary into other memory, e.g. RAM, of the electronic device and bring all of the other processors to an active state with SAL coordination 460. The OS and/or SAL firmware will also take appropriate actions to eliminate portions of the old binary that may be present within the processors' cache memory. If the system is to execute the updated firmware without rebooting the system, the Operating system has to co-operate with the update process and re-register all the PAL firmware procedural entry points with the SAL firmware and provide appropriate mappings for the same. In this embodiment, there is no down time for the electronic system and the electronic system functions as a highly reliable, available and serviceable (RAS) system.

This method is capable of not only preventing a virus attack but also at the same time allowing valid binaries supplied by the processor vendor to be integrated into the non-volatile flash ROM device. This type of update allows system firmware to be upgraded in the field by the end user with an OS hosted utility and at the same time guarantees that the updated code is the vendor trusted code. This method allows the processor architecture to be updated with patches for bug fixes and also allows processor upgrades on the system.

What is claimed is:

1. A computer, comprising:
   a processor; and
   a non-volatile memory, the processor being coupled to the non-volatile memory by a system bus, wherein the non-volatile memory includes a FLASH memory and the non-volatile memory further including:
   a processor abstraction layer, and
   a system abstraction layer.

2. The computer of claim 1, wherein execution, by the processor, of a procedure within the system abstraction layer is to update at least one binary block in the nonvolatile memory.

3. The computer of claim 1, wherein the processor abstraction layer includes an authentication routine to authenticate an update to the at least one binary block that is in the processor abstraction layer, the procedure within the system abstraction layer to cause the execution of the authentication routine prior to the update to the at least one binary block.

4. The computer of claim 3, wherein the at least one binary block in the nonvolatile memory includes a header that has a field selected from a group consisting of a version number and a date stamp.

5. The computer of claim 4, wherein the authentication routine is to authenticate based on a value of the field in the header.

6. A computer, comprising:
a processor; and
a non-volatile memory, the processor being coupled to the non-volatile memory by a system bus, and the non-volatile memory further including:
a processor abstraction layer, wherein the processor abstraction layer includes multiple binary code blocks which provide a standard firmware interface to abstract processor implementation specific features of the processor; and
a system abstraction layer.

7. The computer of claim 6, wherein execution, by the processor, of a procedure within the system abstraction layer is to update at least one of the multiple binary code blocks.

8. The computer of claim 7, wherein the processor abstraction layer includes an authentication routine to authenticate an update to the at least one binary code block, the procedure within the system abstraction layer to cause the execution of the authentication routine prior to the update to the at least one binary code block.

9. The computer of claim 8, wherein the at least one binary code block includes a header that has a field selected from a group consisting of a version number and a date stamp.

10. The computer of claim 9, wherein the authentication routine is to authenticate based on a value of the field in the header.

11. A computer, comprising:
a processor; and
a non-volatile memory, the processor being coupled to the non-volatile memory by a system bus, and the non-volatile memory further including:
a processor abstraction layer, wherein the processor abstraction layer includes at least one binary code block comprising an enhancement to the processor; and
a system abstraction layer.

12. The computer of claim 11, wherein execution, by the processor, of a procedure within the system abstraction layer is to update the at least one of the binary code block.

13. The computer of claim 12, wherein the processor abstraction layer includes an authentication routine to authenticate an update to the at least one binary code block, the procedure within the system abstraction layer to cause the execution of the authentication routine prior to the update to the at least one binary code block.

14. The computer of claim 13, wherein the at least one binary code block includes a header that has a version number, wherein the authentication routine is to authenticate based on a value of the version number.

15. A computer, comprising:
a processor; and
a non-volatile memory, the processor being coupled to the non-volatile memory by a system bus, and the non-volatile memory further including:
a processor abstraction layer, and
a system abstraction layer, wherein the system abstraction layer includes a procedure interface which imposes a unique header onto multiple binary blocks held in the processor abstraction layer for the non-volatile memory.

16. The computer of claim 15, wherein the system abstraction layer procedure interface is operatively coupled to an authentication routine in the processor abstraction layer for performing updates to multiple binary blocks held in the non-volatile memory.

17. The computer of claim 16, wherein the authentication routine is to authenticate an update to the multiple binary blocks, the procedure interface within the system abstraction layer to cause the execution of the authentication routine prior to the update to the multiple binary blocks.

18. A computer, comprising:
a processor; and
a non-volatile memory, the processor being coupled to the non-volatile memory by a system bus, and the non-volatile memory further including:
a processor abstraction layer, and
a system abstraction layer, wherein the computer is a reliable available and serviceable computer.

19. The computer of claim 18, wherein execution, by the processor, of a procedure within the system abstraction layer is to update at least one binary code block in the non-volatile memory.

20. The computer of claim 19, wherein the processor abstraction layer includes an authentication routine to authenticate an update to the at least one binary code block, the procedure within the system abstraction layer to cause the execution of the authentication routine prior to the update to the at least one binary code block.

21. The computer of claim 20, wherein the at least one binary code block includes a header that has a version number, wherein the authentication routine is to authenticate based on a value of the version number.

22. A method for an update to a non-volatile memory in an electronic system, comprising:
starting in a firmware of the electronic system and marking a new input binary to be updated in the non-volatile memory;
starting an initialization mode in which a single processor (BSP) is selected for managing the operation of the update;
releasing a protected binary block in the non-volatile memory to be a normal block for programming;
communicating between the single processor and a system abstraction layer (SAL) procedure interface for calling an appropriate authentication routine to validate the new input binary that is executing in the initialization mode; and
providing the new input binary access to the non-volatile memory and copying the new input binary into the non-volatile memory to update the non-volatile memory if the new input binary is authenticated.

23. The method of claim 22, wherein calling an appropriate authentication routine to validate the new input binary includes using the SAL procedure interface for calling a processor abstraction layer authentication routine from the non-volatile memory for a processor abstraction layer update.

24. The method of claim 22, wherein calling an appropriate authentication routine to validate the new input binary includes using the SAL procedure interface for calling a system abstraction layer authentication routine from the non-volatile memory for a system abstraction layer update.

25. The method of claim 22, wherein providing the new input binary access to the non-volatile memory and copying the new input binary into the non-volatile memory includes using a system abstraction layer for adjusting an a number of directory table entries within a firmware interface table (FIT) to point to the new input binary.

26. A method for a run-time update of a non-volatile memory of an electronic system, comprising:

exposing a system abstraction layer (SAL) update procedure to a caller program of an update utility for updating the non-volatile memory with a new input binary;

selecting a lead processor, in coordination with an operating system of the electronic system, to perform the run-time update using the SAL update procedure;

using the SAL update procedure to call an appropriate authentication routine to validate the new input binary; and using the SAL update procedure to call a specific non-volatile memory implementation routine.

27. The method of claim 26, wherein using a SAL update procedure includes using a firmware update utility for invoking the system abstraction layer update procedure.

28. The method of claim 26, wherein using the SAL update procedure to call an appropriate authentication routine to validate the new input binary includes using the SAL update procedure to call an appropriate authentication routine to validate a new input binary located on a server network.

29. The method of claim 26, wherein using the SAL update procedure to call an appropriate authentication routine to validate the new input binary includes using the SAL update procedure to call an appropriate authentication routine to validate a new input binary provided over the Internet.

30. The method of claim 26, wherein selecting a lead processor includes bringing other processors in a multiprocessor system into a spin loop.

31. The method of claim 26, wherein using the SAL update procedure to call an appropriate authentication routine includes using the SAL update procedure to call a SAL authentication routine from a system abstraction layer.

32. The method of claim 31, wherein using the SAL update procedure to call a specific non-volatile implementation routine includes installing the new input binary into the system abstraction layer if the new input binary is verified against the appropriate authentication routine.

33. A method for authenticating a new input binary to a non-volatile memory of an electronic system, comprising:

using a system abstraction layer procedure interface from the non-volatile memory to impose a unique header onto binary blocks in the non volatile memory;

exposing the system abstraction layer procedure interface to a caller program in a non-volatile memory update utility; and using the system abstraction layer procedure interface to check the validity of the new input binary by calling an appropriate authentication routine from the non-volatile memory.

34. The method of claim 33, wherein using the system abstraction layer procedure interface in the non-volatile memory to impose a unique header onto binary blocks in the non volatile memory includes imposing a unique header that contains a version number following an ascending order and a date stamp.

35. The method of claim 34, wherein the method further includes replacing a binary block in the non-volatile memory with the new input binary when the new input binary has been authenticated to be of an appropriate version number and date.

36. The method of claim 35, wherein using system abstraction layer procedure interface in the non-volatile memory to impose a unique header onto binary blocks in the non volatile memory includes imposing a unique header onto the new input binary.

37. A computer readable medium having computer-executable instructions, which when executed by a machine, cause the machine to perform operations comprising:

invoking a system abstraction layer update procedure from a non-volatile memory to implement a new input binary into the non-volatile memory;

selecting a lead processor, in coordination with an operating system of an electronic system, to perform a run-time update using the system abstraction layer update procedure;

using the system abstraction layer update procedure to call an appropriate authentication routine; and using the system abstraction layer update procedure to call a specific non-volatile memory implementation routine.

38. The computer readable medium of claim 37, wherein using the system abstraction layer update procedure to call the appropriate authentication routine comprises using the system abstraction layer update procedure to call a processor abstraction layer authentication routine from the non-volatile memory for a processor abstraction layer update.

39. The computer readable medium of claim 37, wherein using the system abstraction layer update procedure to call the appropriate authentication routine comprises using the system abstraction layer update procedure interface to call a system abstraction layer authentication routine from the non-volatile memory for a system abstraction layer update.

40. A method of communicating between a firmware update utility and a non-volatile memory, comprising:

using a system abstraction layer procedure interface from the non-volatile memory for imposing a unique header onto multiple binary blocks in the non volatile memory;

exposing the system abstraction layer procedure interface to the firmware update utility; and using the system abstraction layer procedure interface to check the validity of a new input binary by calling an appropriate authentication routine from the non-volatile memory.

41. The method of claim 40, wherein the method further includes imposing a unique header onto the new input binary and implementing the new input binary in the non-volatile memory when the new input binary has been authenticated to be of an appropriate version number and date.

42. The method of claim 40, wherein using the system abstraction layer procedure to check the validity of the new input binary by calling the appropriate authentication routine from the non-volatile memory comprises using the system abstraction layer procedure to call a processor abstraction layer authentication routine from the non-volatile memory for a processor abstraction layer update.

43. The method of claim 40, wherein using the system abstraction layer procedure to check the validity of the new input binary by calling the appropriate authentication routine from the non-volatile memory comprises using the system abstraction layer procedure to call a system abstraction layer authentication routine from the non-volatile memory for a system abstraction layer update.

* * * * *